(12) United States Patent
Pathak

(10) Patent No.: US 7,933,461 B1
(45) Date of Patent: Apr. 26, 2011

(54) HIGH-SPEED DITHERING ARCHITECTURE

(75) Inventor: Bharat Pathak, Bangalore (IN)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/579,207

(22) Filed: Oct. 14, 2009

Related U.S. Application Data

(63) Continuation of application No. 11/296,035, filed on Dec. 7, 2005, now Pat. No. 7,623,721.

(51) Int. Cl.
*G06K 9/00* (2006.01)
*H04N 1/40* (2006.01)
*H04N 7/12* (2006.01)

(52) U.S. Cl. .................. 382/252; 358/3.05; 375/240.03

(58) Field of Classification Search .......... 382/251–252, 382/260, 275, 299, 298, 305; 358/3.05, 3.26, 358/534–536, 3.13; 345/596, 597, 616; 375/240.03, 375/240.27, 254
See application file for complete search history.

(56) References Cited

U.S. PATENT DOCUMENTS

| | | | |
|---|---|---|---|
| 5,363,213 A * | 11/1994 | Coward et al. | 382/299 |
| 6,307,647 B1 | 10/2001 | Cheung et al. | |
| 6,552,823 B1 | 4/2003 | Chang | |
| 6,671,068 B1 | 12/2003 | Chang et al. | |
| 6,678,073 B1 | 1/2004 | Jewitt | |
| 6,977,663 B2 | 12/2005 | Chang | |
| 6,993,154 B2 | 1/2006 | Brunk | |
| 7,038,814 B2 | 5/2006 | Huovinen | |
| 7,043,089 B2 | 5/2006 | Ballard | |
| 7,171,019 B2 | 1/2007 | Miyake et al. | |
| 7,224,487 B2 * | 5/2007 | Gupta et al. | 358/3.05 |
| 7,339,706 B2 | 3/2008 | Ohta | |
| 7,564,588 B2 * | 7/2009 | Ogawa et al. | 358/3.03 |

* cited by examiner

*Primary Examiner* — Kanji Patel

(57) ABSTRACT

A filter for implementing Floyd Steinberg two-dimensional error diffusion algorithms allows high-speed processing of video and images. The filter is shown in direct form with proper bit precision with implementations that permit the filter to operate at high speed. Furthermore, a reduction in the gate count is achieved over the direct form. The results of static timing analysis obtained post synthesis are also summarized.

20 Claims, 4 Drawing Sheets

HIGH-SPEED DITHERING ARCHITECTURE

This application is a continuation of U.S. patent application Ser. No. 11/296,035, filed Dec. 7, 2005, which is hereby incorporated by reference herein in its entirety.

FIELD OF THE INVENTION

The present invention relates generally to image and video processing, and more particularly to dithering.

BACKGROUND OF THE INVENTION

Dithering (also known as color quantization or error diffusion) is used in image and video processing. Dithering is often used when an image with high resolution (e.g., 24-bit RGB words having eight bits per color) is converted to image with lower resolution (e.g., 18-bit RGB words with six bits per color). When the conversion is performed by (for example) discarding the lowest 2-bits of a pixel, contouring artifacts often result, especially in smoothly graded regions. Dithering is helpful to reducing contouring artifacts that are often caused by simple quantization techniques.

Different types of dithering can be used to reduce contouring artifacts. Some of the different kinds of dithering include the use of ordered mask values, blue noise mask-based dithering, and error diffusion to neighboring pixels. The dithering can be applied to images from photographs, video sources, and the like.

The process of color quantization involves reducing the number of colors available in a color used in an image. For example, a 24-bit ROB color palette contains around 16.7 million colors. When an 18-bit RGB color palette is generated, the generated color palette contains around 262,000 colors. Dithering techniques appear to reduce the contouring artifacts by taking advantage of certain human visual characteristics. The methods for dithering add high frequency noise to the image such that the noise by itself is not typically visible from distance, but that the average effect of noise addition results in a reduction of the contouring artifacts. At the same time, these techniques work to create the appearance of colors being present from the original color palette in the quantized image.

Floyd and Steinberg dithering is widely used in digital halftoning of intensity images for printing applications. The same concept is also applied for dithering of color images. Dithering of color images is normally used where some conventional display and printing devices do not have the capability to reproduce a true-color (16.7 million colors) image. Such devices often lack the ability to reproduce a true-color image because 6 bit row and column drivers usually cost much less than 8 bit row and column drivers. Accordingly, the last two bits of information are discarded by means of appropriate dithering technique before the truncated image data is sent to the display device. Because color quantization is performed just before the data is sent to row and column drivers of displays, the color quantization is performed at a rate that is suitable for the row and column drivers.

An appreciation of the present invention and its improvements can be obtained by reference to the accompanying drawings, which are briefly summarized below, to the following detailed description of illustrated embodiments of the invention, and to the appended claims.

DETAILED DESCRIPTION OF THE PREFERRED EMBODIMENT

Figure 1:
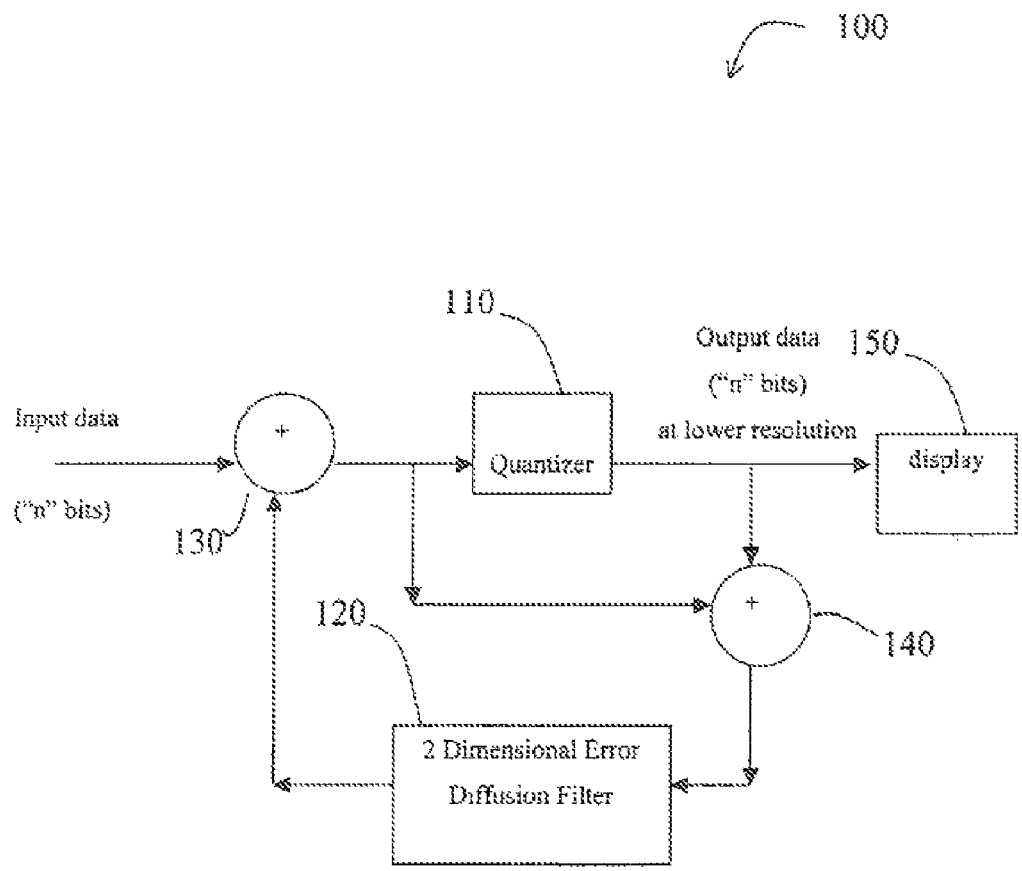
FIG. 1 is a block diagram of error diffusion-based color quantization in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The present invention is directed to present a high-speed architecture for implementing Floyd Steinberg two-dimensional error diffusion algorithms. The high-speed two-dimensional filter is suitable for video and image processing. The filter is shown below in direct form with proper bit precision and with implementations that permit the filter to operate at high speed. Furthermore, a reduction in the gate count is achieved over the direct form. The results of static timing analysis obtained post-synthesis are also summarized.

FIG. 1 is a block diagram of error diffusion-based color quantization in accordance with the present invention. Error diffusion-based color quantizer 100 comprises quantizer 110, two-dimensional error diffusion filter 120, summing nodes 130 and 140, and display 150.

In operation, the incoming data is quantized. For example, 10 bits of Red or Green or Blue (RGB) color values are quantized to either eight bits of precision or 6 bits of precision at the output. In the case of quantization to eight bits, the bottommost (i.e., two LSBs) bits of output have a "00" value. In the case of output precision being six bits, bottommost four (LSBs) bits have a "0000" value. The incoming bits of input data are presented to a first input of summing node 130.

A second input of summing node 130 receives values produced by an error diffusion filter. In an embodiment, the filter is a two-dimensional filter in accordance with the following filter coefficients, $$\left\{\frac{\begin{vmatrix} 1 & 5 & 3 \\ 7 & X & 0 \end{vmatrix}}{16}\right\}$$

where "X" represents a current pixel of interest. Because the filter coefficients are constants, the multipliers in the filter are implemented using binary shift and add operations. Summing node 130 adds the two input streams and presents the results to quantizer 110 and to the summing node 140.

Quantizer 110 reduces the effective bit width of the added data. In an embodiment, quantizer 110 is truncation-based (as compared to a rounding-based quantizer). Truncation-based quantization decreases hardware requirements and helps the design to work at high frequencies. In the truncation system of the embodiment, the bottom four bits of the quantizer output (for output resolution of six bits) or two bits (for output resolution of eight bits) often result in quantization errors, which are sent directly to the error diffusion filter.

The resulting quantization error typically has a flat magnitude response in frequency domain (for an open loop case), which in turn is shaped by the filter in the feedback path (which begins at the output node of summing node 140. The filtering in the feedback path results in "high pass" shaping of the quantization error. The high pass shaping of quantization noise is also referred as "blue noise." The shaped noise (i.e., the error diffusion filter output) is then diffused back to the adjacent incoming pixels. Thus, the noise shaping and diffusion results in effective removal of contouring artifacts when the output of the quantizer 110 is presented to display 150.

Figure 2:
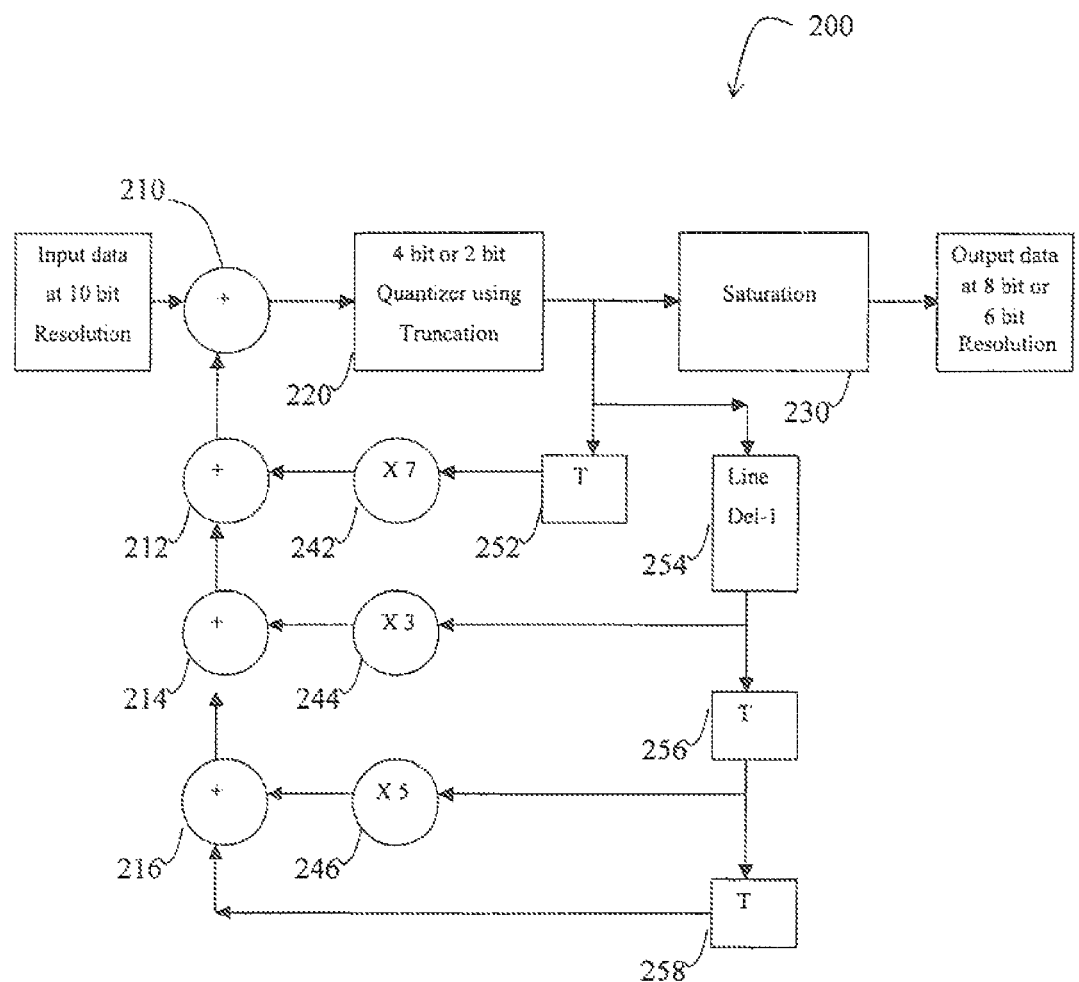
FIG. 2 is a block diagram of a two-dimensional Floyd Steinberg filter in direct form in accordance with the present invention.

FIG. 2 is a block diagram of a two-dimensional Floyd Steinberg filter in direct form in accordance with the present invention. Quantization filter 200 comprises quantizer 220, saturation block 230, summing nodes 210, 212, 214, 216, shift- and add-based multipliers 242, 244, 246, unit delays 252, 256, 258, and line delay 254.

The dithering structure 200 shown in FIG. 2 is a direct form of implementation. In the embodiment, the input is at a 10-bit resolution level and the output is also at a 10-bit level, with the output resolution at eight bits or six bits, depending on how much quantization is selected. The quantization error (i.e., the LSBs of the quantizer) is fed to the error diffusion filter. Because the error diffusion filter is 2-dimensional, an additional line delay is used. The line delay is of word-length, which is typically equal to the horizontal resolution of image. For example, in high definition TV standards, a standard one line of active data comprises 1920 pixels.

In an embodiment, the memory selected for implementing the line delay is a single port RAM. However, the functionality of a dual port memory is implemented in order to write the quantization error values as well as to read one line-delayed versions from the same location in the same clock. But since a dual port RAM consumes more than twice the layout area of single port RAM, a single port RAM is used.

The behavior of dual port memory is emulated in the embodiment by writing two data words in one clock cycle and reading two data words in another clock cycle. This can be done by reducing the depth of the memory by a factor of two while doubling the width of the memory. In an example application, a memory for supporting HDTV comprises a resolution of 1920 pixels by 1080 lines. Accordingly, one line of storage would comprise 1920 words×16 bits, in order to implement dual port RAM (or 960 words by 32 bits if single port RAM is used). Sixteen bits is allocated for each word because five bits each are allocated for the quantization error in corresponding red, green and blue pixels. Thus, a word of 16 bits (being the nearest power of two) is selected as the size of the quantization error data that gets stored into the line buffer (or delay).

As shown in the FIG. 2, five adders are arranged in series (starting from an adder comprised by shift- and add-based multiplier 256). The arrangement of the adders in series often results in timing violation at higher operating frequencies. Furthermore, register pipelining (used to solve timing violations in the feedback path) can alter the transfer function relationship from input to output.

Figure 3:
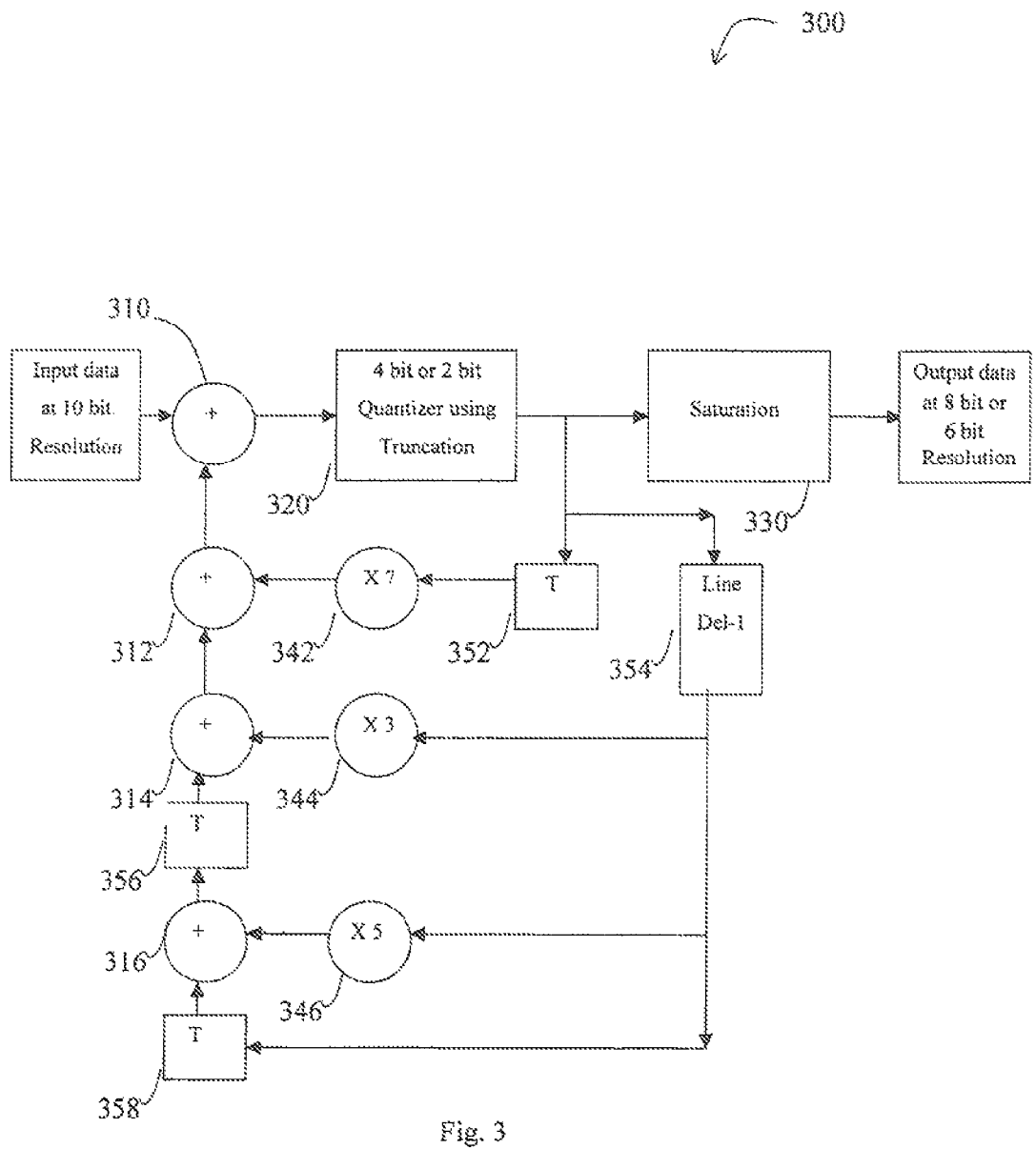
FIG. 3 is a block diagram of a two-dimensional Floyd Steinberg filter in transposed form in accordance with the present invention.

FIG. 3 is block diagram of a two-dimensional Floyd Steinberg filter in transposed form in accordance with the present invention. Transposed quantization filter 300 comprises quantizer 320, saturation logic 330, summing nodes 310, 312, 314, 316, shift- and add-based multipliers 342, 344, 346, unit delays 352, 356, 358, and line delay 354.

In the example of transposed architectural form, the delay elements of the filter have been arranged to break long combinational adder paths. The arrangement of delay elements is accomplished without affecting the transfer function of the filter. With this architecture the number of adders in the timing critical path has been reduced from five in direct form to four adders in the transposed form. The reduction in the number of adders in the timing critical path reduces the length of the timing critical path. The reduced length of the timing critical path increases the maximum speed at which the circuit operates.

Figure 4:
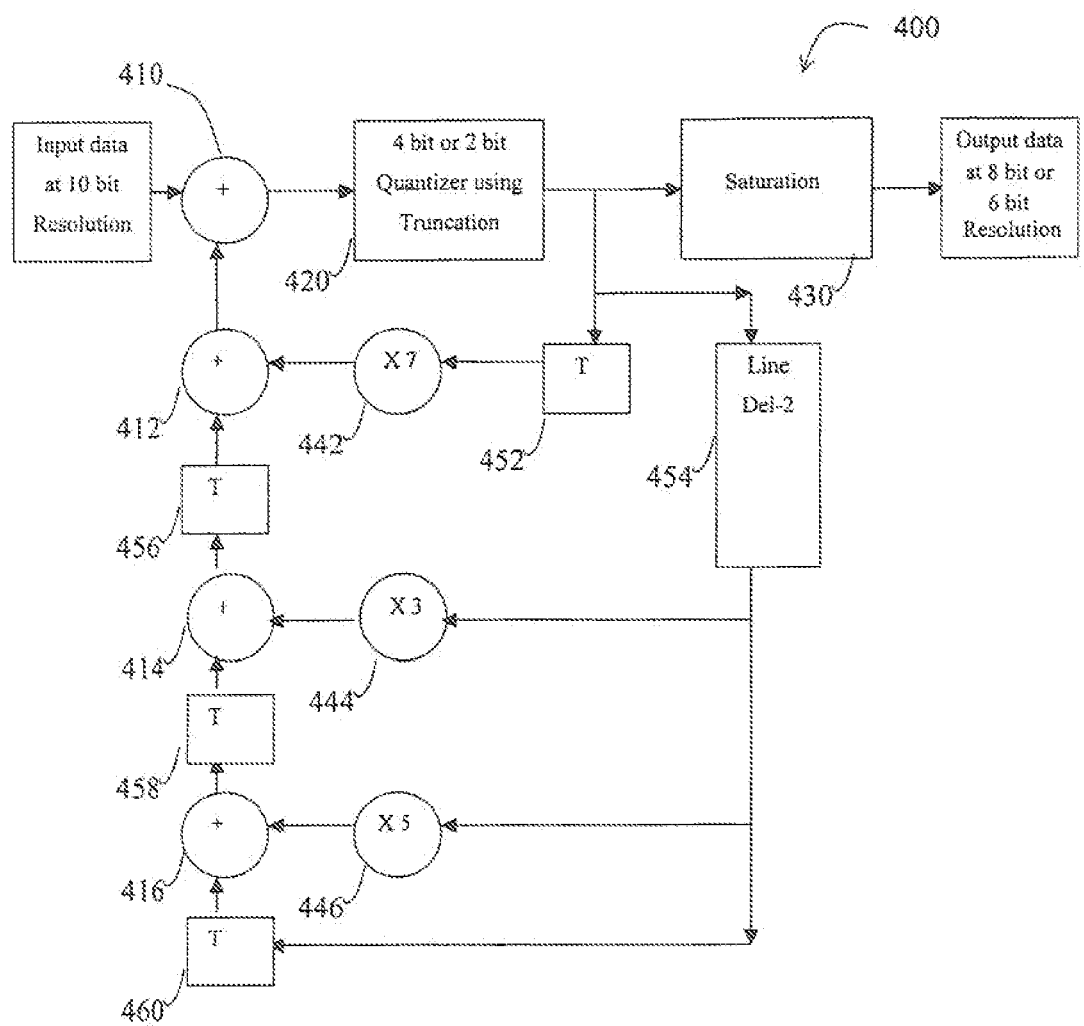
FIG. 4 is a block diagram of a two-dimensional Floyd Steinberg filter in modified transposed form in accordance with the present invention.

FIG. 4 is a block diagram of a two-dimensional Floyd Steinberg filter in modified transposed form in accordance with the present invention. Quantization filter 400 comprises quantizer 420, saturation logic 430, summing nodes 410, 412, 414, 416, shift- and add-based multipliers 442, 444, 446, unit delays 452, 456, 458, 460, and line delay 454.

High-speed operation and low-area implementations are achieved by deriving a pipeline stage from memory and propagating it in the feedback path. The series of sequential adders of FIG. 3 has been further reduced to three adders in series. The amount of error data storage implemented is still 1920 words by 16 bits, but in order to meet the timing constraints, data is derived (e.g., "clocked out") two clocks earlier from the memory. In FIGS. 2 and 3, data was clocked out only one clock earlier. Deriving the error values two clock earlier enables an additional pipeline stage to be included in the error diffusion filter data-path.

This substitution of an additional pipeline stage in the filter data-path allows a reduction in the series adder path from four adders (including the adders in the multiplication units of the multipliers) in FIG. 3 to three adders in FIG. 4, which contributes to making the design to be able to work at even higher frequencies. The presence of inactive time in every line of video data allows sufficient time to derive the error data two clocks earlier from the line delay memory.

With the modified pipeline arrangement, the modified transposed architecture is able to operate at 208 MHz. As shown in FIG. 4, the modified transposed architecture comprises only three adders in series (between any two unit delays) in the data path, which reduces the time critical path, and allows the architecture to operate at 208 MHz.

The design was synthesized using 0.18μ digital cell library. The clock frequency used for synthesis is 208 MHz (i.e., with a clock period of 4.8 ns).

TABLE 1

Summary of synthesis results

| Architecture | Timing | Slack | Combinational Area | Non-Combinational Area | Total Gate Count |
|---|---|---|---|---|---|
| Direct form | Violated | −1.63 | 2439 | 671 | 3111 |
| Transposed form | Violated | −0.68 | 2334 | 761 | 3096 |
| Modified Transposed Form | Met | 0.00 | 1791 | 921 | 2712 |

From the example synthesis results shown in Table 1, it is apparent that the direct form does not meet a timing specification of 208 MHz (the maximum frequency at which the direct form architecture can work is 155 MHz). The transposed form of the Floyd Steinberg two-dimensional architecture operates at higher frequencies and can run up to maximum of 182 MHz. The modified transposed form meets the timing specification of 208 MHz. The pre-layout synthesis result of 208 MHz provides a margin of error in the design specifications such that actual (silicon) implementations should exceed a manufacturing specification of 200 MHz. From the gate count column in the table it is also apparent that this improvement in timing can be obtained without significant additional overhead in silicon area.

Various embodiments of the invention are possible without departing from the spirit and scope of the invention. The above specification, examples and data provide a complete description of the manufacture and use of the composition of the invention. For example, the architecture can be implemented using hardware, software, or a combination of both. Since many embodiments of the invention can be made without departing from the spirit and scope of the invention, the invention resides in the claims hereinafter appended.

I claim:

1. A method for dithering, comprising:
   receiving image data having a first resolution;
   combining first filtered image data and second filtered image data to provide filtered quantization error data, wherein the first filtered image data is extracted from the received image data and the second filtered image data is extracted from previously received image data;
   adding the filtered quantization error data to the received image data to provide modified image data; and
   quantizing the modified image data with a quantizer to provide output image data having a second resolution, wherein the second resolution is lower than the first resolution.

2. The method of claim 1, further comprising:
   quantizing the received image data with the quantizer to provide quantization error data; and
   filtering the quantization error data with an error diffusion filter to provide the first filtered image data.

3. The method of claim 1, further comprising:
   quantizing the previously received image data with the quantizer to provide quantization error data; and
   filtering the quantization error data with an error diffusion filter to provide the second filtered image data.

4. The method of claim 1, further comprising:
   quantizing the previously received image data with the quantizer to provide first quantization error data;
   quantizing the received image data with the quantizer to provide second quantization error data; and
   filtering the first and second quantization error data with an error diffusion filter to provide the first and second filtered image data.

5. The method of claim 4, wherein the error diffusion filter is a two-dimensional filter defined by the matrix $$\frac{\left\{\begin{vmatrix} 1 & 5 & 3 \\ 7 & X & 0 \end{vmatrix}\right\}}{16},$$

wherein X represents the received image data.

6. The method of claim 4, wherein filtering the first and second quantization error data comprises:
   multiplying the first quantization error data by a first series of constants and summing first results of each multiplication operation to provide the first filtered image data; and
   multiplying the second quantization error data by a second series of constants and summing second results of each multiplication operation to provide the second filtered image data;
   wherein the combining comprises summing the first filtered image data and the second filtered image data to provide the filtered quantization error data.

7. The method of claim 6, wherein each summing operation is performed using an adder, the method further comprising:
   delaying the first quantization error data by at least a length of one word; and
   delaying results of at least one summing operation in order to reduce a number of adders in a timing critical path.

8. The method of claim 4, wherein filtering the first and second quantization error data comprises:
   delaying the first quantization error data by a length of two words;
   summing a pipeline delayed version of the delayed first quantization error data and the delayed first quantization error data multiplied by a first constant to produce the first filtered image data; and
   summing a pipeline delayed version of the first filtered image data and the delayed first quantization error data multiplied by a second constant to produce the second filtered image data;
   wherein the combining comprises summing a pipeline delayed version of the second filtered image data and a pipeline delayed version of the second quantization error data multiplied by a third constant to provide the filtered quantization error data.

9. The method of claim 1, wherein the modified image data comprises a number of bits and quantizing the modified image data comprises reducing the number of bits in the modified image data.

10. The method of claim 4 further comprising:
    storing the first quantization error data and the second quantization error data in a memory during a first clock cycle; and
    retrieving the first quantization error data and the second quantization error data from the memory in a second clock cycle.

11. An image dithering system, comprising:
    input circuitry configured to receive image data having a first resolution;
    combining circuitry configured to combine first filtered image data and second filtered image data to provide filtered quantization error data, wherein the first filtered image data is extracted from the received image data and the second filtered image data is extracted from previously received image data;
an adder configured to add the filtered quantization error data to the received image data to provide modified image data; and
a quantizer configured to quantize the modified image data to provide output image data having a second resolution, wherein the second resolution is lower than the first resolution.

12. The system of claim 11, wherein the quantizer is further configured to quantize the received image data to provide quantization error data, the system further comprising:
an error diffusion filter configured to filter the quantization error data to provide the first filtered image data.

13. The system of claim 11, wherein the quantizer is further configured to quantize previously received image data to provide quantization error data, the system further comprising:
an error diffusion filter configured to filter the quantization error data to provide the second filtered image data.

14. The system of claim 11, wherein the quantizer is further configured to:
quantize the previously received image data to provide first quantization error data; and
quantize the received image data to provide second quantization error data;
wherein the system further comprises:
an error diffusion filter configured to filter the first and second quantization error data to provide the first and second filtered image data.

15. The system of claim 14, wherein the error diffusion filter is a two-dimensional filter defined by the matrix $$\frac{\left\{ \begin{vmatrix} 1 & 5 & 3 \\ 7 & X & 0 \end{vmatrix} \right\}}{16},$$

wherein X represents the received image data.

16. The system of claim 14, wherein the error diffusion filter is further configured to:
multiply the first quantization error data by a first series of constants and sum first results of each multiplication operation to provide the first filtered image data; and
multiply the second quantization error data by a second series of constants and sum second results of each multiplication operation to provide the second filtered image data;
wherein the combining circuitry is further configured to sum the first filtered image data and the second filtered image data to provide the filtered quantization error data.

17. The system of claim 16, wherein each summing operation is performed using an adder, and wherein the error diffusion filter comprises:

a memory delay unit configured to delay the first quantization error data by at least a length of one word; and
at least one pipeline delay unit configured to:
receive an output of one of the adders;
delay the adder output; and
provide the adder output to another one of the adders, wherein the delay unit is arranged so that no more than three adders are arranged sequentially in the error diffusion filter.

18. The system of claim 14, wherein the error diffusion filter comprises:
a memory unit configured to delay the first quantization error data by a length of two words to provide delayed error data;
a first multiplier configured to multiply the delayed error data by a first constant to provide first scaled error data;
a second multiplier configured to multiply the delayed error data by a second constant to provide second scaled error data; and
a third multiplier configured to multiply the second quantization error data by a third constant to provide third scaled error data;
and wherein the wherein the combining circuitry comprises:
a first pipeline delay unit configured to further delay the delayed error data to provide twice delayed error data;
a first adder configured to sum the twice delayed error data and the first scaled error data to provide the first filtered image data;
a second pipeline delay unit configured to delay the first filtered image data to provide delayed first filtered image data;
a second adder configured to sum the delayed first filtered image data and the second scaled error data to produce the second filtered image data;
a third pipeline delay unit configured to delay the second filtered image data to provide delayed second filtered image data; and
a third adder configured to sum the delayed second filtered image data and the third scaled error data to provide the filtered quantization error data.

19. The system of claim 11, wherein the modified image data comprises a number of bits, and wherein the quantizer is further configured to reduce the number of bits in the modified image data.

20. The system of claim 14 further comprising processing circuitry configured to:
store the first quantization error data and the second quantization error data in a memory unit during a first clock cycle; and
retrieve the first quantization error data and the second quantization error data from the memory unit in a second clock cycle.

* * * * *